United States Patent [19]

Leader et al.

[11] Patent Number: 5,113,793
[45] Date of Patent: May 19, 1992

[54] MOBILE PET CARRIER

[76] Inventors: Harvey G. Leader; Maureen M. Leader, both of 199 Charles Street, Midland, Ontario L4R 2X6, Canada

[21] Appl. No.: 742,370
[22] Filed: Aug. 8, 1991
[51] Int. Cl.[5] ............................................. A01K 29/00
[52] U.S. Cl. .................................... 119/19; 280/47.26
[58] Field of Search ...................... 119/19, 15, 17, 20; 280/47.26, 47.19, 47.17

[56]         References Cited
       U.S. PATENT DOCUMENTS

| 1,143,774 | 6/1915 | Nicholls | 296/77.1 |
| 2,689,745 | 9/1954 | Rosenberry | 280/47.26 |
| 2,790,414 | 4/1957 | Rossow | 119/19 |
| 4,349,210 | 9/1982 | Rutt | 280/47.26 |
| 4,484,540 | 11/1984 | Yamamoto | 119/19 |
| 4,811,968 | 3/1989 | Bolden | 280/47.26 |

Primary Examiner—John G. Weiss
Attorney, Agent, or Firm—Edward M. Livingston

[57] ABSTRACT

A mobile animal carrier (1) having a cage-like enclosure (15) mounted on a specially-designed carriage (20) with wheels (7, 8, 10 and 11) for holding and transporting the enclosure, the carriage having a handle (3) to make pushing easy for the pet owner. The enclosure contains an access, preferably consisting of at least one door (17) in a front end of the enclosure for inputting and removing a pet or other animal (14). A canopy (2) is provided to cover the enclosure, said canopy having a fastener (16) for adjustably opening the canopy as desired. The enclosure is designed to be removable from the carriage and collapsible for easy storage and transporting when not in use. Similarly, the carriage can be folded for easy storage and transportation as well.

8 Claims, 1 Drawing Sheet

MOBILE PET CARRIER

BACKGROUND OF THE INVENTION

This invention relates generally to animal cages and more particularly to a mobile carrier for pets and other animals. Most persons find it difficult to transport pets while walking or visiting.

Almost all indoor places, such as shopping malls and tourist attractions, and even many outdoor locations, such as parks and beaches, prohibit pets and other animals, especially dogs, from being walked, even if the pets are on a leash. Moreover, even with pets on a leash, there is still a danger of the pet escaping and in some cases biting someone or having an altercation with another animal.

Currently, the options available to pet owners are limited and restrictive. One option is to leave the pet in a vehicle, but that is prohibited in many states such as Florida, where quick heat build-up in a vehicle, especially a car, can be devastating or fatal to an animal. Even leaving the window open is insufficient for adequate ventilation.

Another option is to carry the pet wherever the owner goes. This option is impractical with large dogs and tiresome even with small pets.

Another option is to leave the pets home when the visit is short or at a kennel when away for extended periods of time.

Of course, another option is not to visit or go anywhere at all.

None of the above options are very satisfactory.

For the aforementioned reasons, there is a need for a device to make it easy, safe and convenient for a pet to accompany an owner on various excursions.

The prior art is devoid of any patented pet carriers like the present invention. The following U.S. Patents relate to animal cages, pet carriers and carriage-like devices:

| U.S. Pat. No. | Inventor | Date of Patent |
| --- | --- | --- |
| 4,763,606 | Ondrasik, II | 08/16/88 |
| 2,857,880 | Stone, Jr. | 10/28/58 |
| 2,790,414 | Rossow | 04/30/57 |
| 1,143,774 | Nicholls | 06/22/15 |
| 1,289,965 | Tichenor | 12/31/18 |
| 1,732,878 | Collender | 10/22/29 |
| 1,412,935 | Greenebaum | 04/18/22 |
| 3,490,417 | Swinney | 01/20/70 |

The Ondrasik patent teaches a modular collapsible cage with wheels on the bottom. However, this cage is not mounted on a carriage and has an entirely different structure than the present invention. The Stone, Jr. patent teaches another animal cage with wheels on the bottom to make it mobile, but it, too, is not on a carriage. The Rossow teaches a portable pet house with wheels on one side on the bottom so that when the cage is elevated from the other side, the cage can be moved. The Nicholls teaches a canopy for a baby carriage to protect the child from mosquitoes and other elements. The Tichenor patent teaches another canopy for a baby carriage. The Collender patent shows another protecting canopy for a baby carriage as does the Greenebaum patent. Finally the Swinney patent shows a portable shipping and living cage for animals.

Contrary to the prior patented devices, the present invention provides a carriage-like pet carrier that has the advantages of being mobile, easy to push, and which contains a pet or other animal in such a manner that it cannot escape, yet still allows adequate ventilation for said pet.

SUMMARY OF THE INVENTION

The primary object of the present invention is to provide a pet carrier that is mobile so a pet can be taken with the owner almost anywhere.

Another object of the present invention is to provide such a carrier that is safe for the pet as well as third parties, whether they be other persons or pets.

A further object of the present invention is to provide such a carrier that allows adequate ventilation for the pet.

An even further object of the present invention is to provide such a carrier that can hide a pet from view and protect the pet from natural elements such as sunlight, rain and insects, such as mosquitoes and flies.

An additional object of the present invention is to provide such a carrier that is collapsible for convenient storage and transportation.

The present invention fulfills the above and other objects by providing a mobile carrier comprising a cage-like enclosure having access means for inputting and removing an animal. The enclosure is box-shaped, having two sides, a top and bottom and front and back ends. The enclosure is mounted on a carriage which has means for holding the enclosure in place, such as of side borders and a front bar. The carriage has wheels on the bottom thereof and a handle in the back, which extends angularly upward and backward to provide means for pushing the carrier by the owner.

The access means for inputting and removing a pet would preferably consist of a door attached by hinges on the front end of the enclosure. The enclosure can also be provided with a form-fitting canopy to protect the animal from the natural elements. This canopy could be provided with adjustable fastening means such as hook and loop fastening material, like that sold under the name "Velcro", in order to provide the animal with more ventilation. The enclosure is removable from the carriage and collapsible for easy transportation and storage when not in use. Similarly, the carriage itself could be foldable, so that the entire invention can be conveniently and easily stored and transported as desired.

These and other objects and advantages of the present invention may become more readily apparent when discussed in conjunction with a detailed description of a preferred embodiment hereinafter.

BRIEF DESCRIPTION OF THE DRAWINGS

This invention is described by claims in relation to a description of a preferred embodiment illustrated in the following drawings in which:

DESCRIPTION OF A PREFERRED EMBODIMENT

Figure 1:
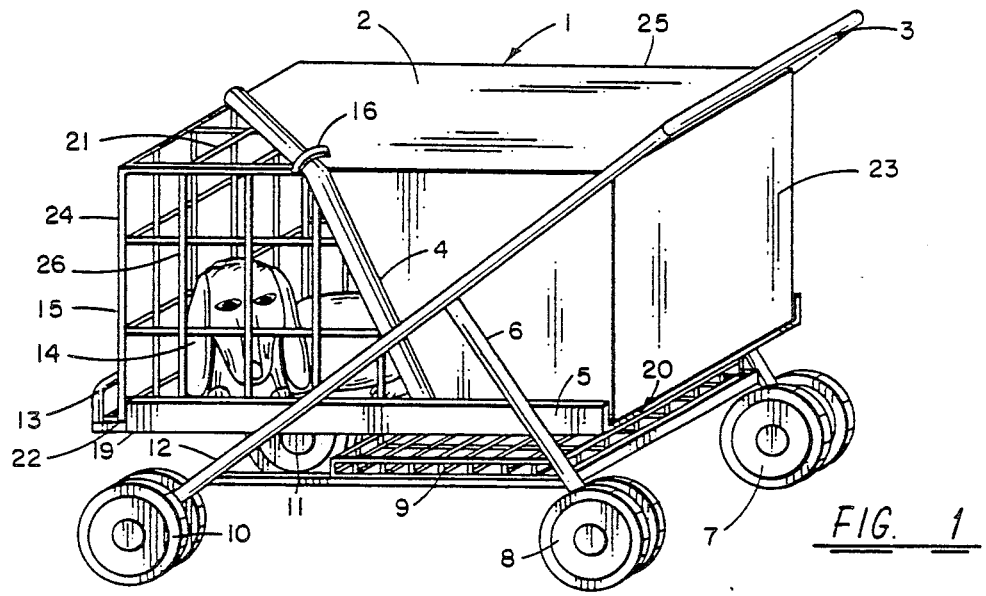
FIG. 1 is a perspective view of the mobile pet carrier in use.
Figure 2:
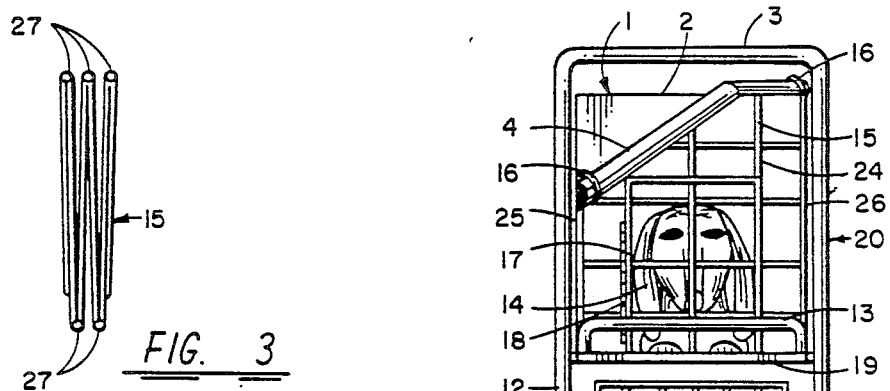
FIG. 2 is a front view of the mobile pet carrier.

With reference to the drawings, particularly FIGS. 1 and 2, the pet carrier 1 generally contains two major components, one being the cage-like enclosure 15, and the other being the carriage-like carrier 20. The enclosure 15 is preferably box-like so that it may fit on the carriage conveniently, having a top side 21, a bottom side 22, a back end 23, a front end 24, and two sides 25 and 26. The enclosure would preferably be made of parallel wire strands running vertically connected by parallel horizontal strands of wire. The bottom side 22 of the enclosure 15 could be solid or also made of the same wire material. The bottom side 22 even further could be elevated above the carriage bottom support 6 so as to allow for droppings onto a solid plate below for easier cleaning of waste from the pet 14 contained within the enclosure 15.

As illustrated in FIG. 2, the enclosure 15 could have access means consisting of a door 17 hinge-ably mounted on the front end 24 of the enclosure 15. The door 17 could also have a hook or hooks 18 on the side opposite the hinges for easy opening and closing to secure the door 17 to keep the pet 14 from escaping.

As also shown in FIGS. 1 and 2, the carriage 20 would support the enclosure on a cage support tray 19. The support tray 19 would be preferably made of metal or other strong material to support the weight of the enclosure. In addition, the support tray 19 could have borders 5 on each side of the carriage 20 to keep the enclosure 15 in place as well as a front holding bar 13 to keep the enclosure from sliding forward. The carriage 20 would be mounted on wheels 7, 8, 10 and 11 by bottom supports 6 and front support legs 12 similar to a baby carriage.

For pushing, the carriage 20 would have a handle 3 extending angularly upward and backward from the back wheels 7 and 8 to a height convenient for the owner to push the pet carrier 1 where desired.

Besides the two major components—the enclosure 15 and the carriage 20—numerous optional devices may be included. For example, as shown in FIGS. 1 and 2 a canopy is provided to cover the enclosure 15 to protect the pet 14 from the natural elements, such as rain and sun, and insects, such as mosquitoes and flies. Moreover, the canopy 2 will hide the pet 14 from view as desired. In order to provide a view for the pet 14 and better ventilation, adjustable fastening means such as strips of hook and loop fastening material 16, could be provided at various locations along the bottom and sides of the canopy 2. The canopy 2 could be made to be form-fitting to the shape and size of the enclosure 15, depending on the size of the pet 14. Preferably, the enclosure 15 could be made in various sizes, small, medium and large, to handle almost any size of pet. Likewise, the carriage 20 could be made in a size sufficient for almost any animal.

Figure 4:
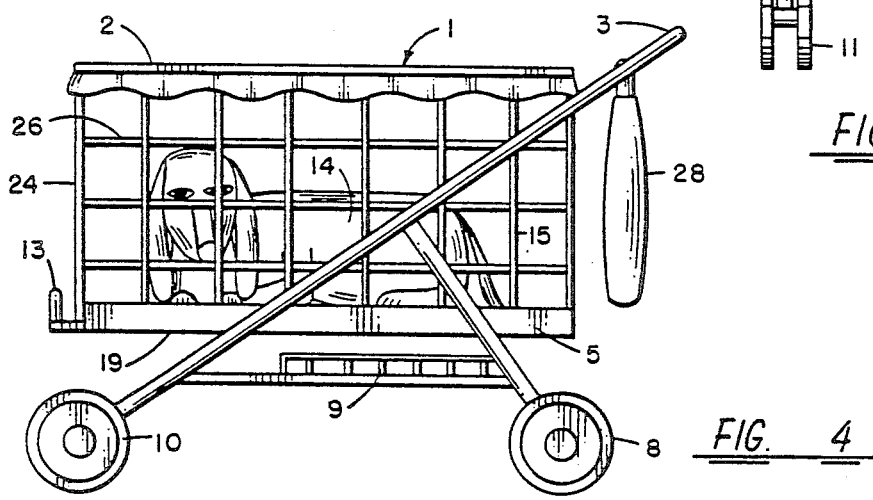
FIG. 4 is a side view of the mobile pet carrier with a different canopy.

FIG. 4 illustrates another ersion of a canopy 2 that fits over and covers just the top of the pet carrier.

Another optional feature could be a basket 9 as shown in FIGS. 1 and 2 to hold various food supplies and other items for the pet 14.

As shown in FIG. 4, another optional feature could include a bag 28 that would snap to the carriage handle 3 for holding various items for the owner and pet.

Figure 3:
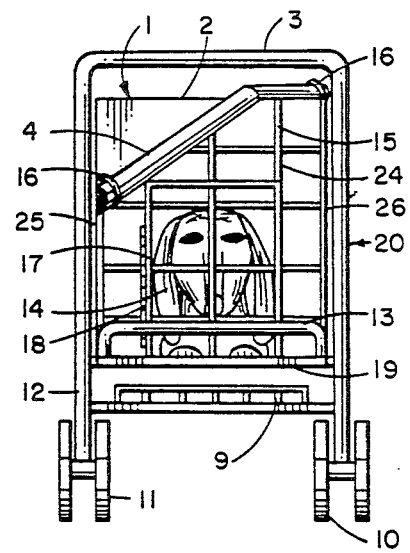
FIG. 3 is an end view of the cage in its collapsed state.

The enclosure 15 can be made collapsible to a size as shown in FIG. 3 by having the various top, bottom and side ends connected at their junctures to each other in a hinge-like manner 27. Even furthermore, the carriage 20 can be made foldable for easy storage and transportation.

From the above detailed description of preferred embodiment, it should be apparent that the present invention offers numerous advantages not available to pet owners heretofore. The present invention enables the owner to take a pet or animal almost anywhere and protect the pet from other animals as well as the natural elements. The present invention could make the accompaniment of owners by their pets possible and almost universally acceptable in places where pets are not currently allowed.

Although one preferred embodiment of the invention has been described, modifications and improvements within the scope or equivalent of the claims are included in this invention.

Having thus described our invention we claim:

1. A mobile animal carrier comprising:
   a cage-like enclosure having front, rear and interconnecting sides with access means for inputting and removing an animal contained in at least one side thereof; and
   a carriage for supporting said enclosure, said carriage having wheels on its bottom and a handle, said handle extending angularly upward and backward from the carriage to provide means for pushing the mobile animal carrier, wherein the enclosure is removable from the carriage.

2. The mobile animal carrier of claim 1 wherein the cage has hinge or latch means on each side so that it is collapsible for easy storage and transportation when not in use.

3. The mobile animal carrier of claim 1 or 2 wherein a canopy is provided for covering the enclosure.

4. The mobile animal carrier of claim 3 wherein the canopy has fastening means on a side and top thereof in order that the canopy can be rolled up on the sides to provide ventilation and visibility to an animal within the enclosure.

5. The mobile pet carrier of claim 1 wherein the carriage can be disassembled, folded and collapsed when the enclosure is removed so that the carriage can be easily stored and transported when not in use.

6. The mobile animal carrier of claim 1 wherein the carriage contains a basket mounted under the enclosure, said basket for carrying animal food and other items.

7. The mobile animal carrier of claim 1 wherein the enclosure is mounted in an elevated manner above a holding tray in the carriage in order that waste can be collected on a tray below the enclosure for easy cleaning as is necessary.

8. The mobile animal carrier of claim 1 wherein the enclosure access means consists of a door in the front side of the enclosure.

* * * * *